United States Patent [19]
Arstein et al.

[11] Patent Number: 5,685,377
[45] Date of Patent: Nov. 11, 1997

[54] AUTO-RETURN FUNCTION FOR A BULLDOZER RIPPER

[75] Inventors: Richard A. Arstein, Sahuarita, Ariz.; Richard J. Skiba, Peoria, Ill.

[73] Assignee: Caterpillar Inc., Peoria, Ill.

[21] Appl. No.: 708,518

[22] Filed: Sep. 5, 1996

[51] Int. Cl.⁶ .................................................. A01B 63/111
[52] U.S. Cl. ........................................ 172/2; 172/699
[58] Field of Search ............................ 172/2, 4, 4.5, 6, 172/7, 112, 439, 699; 37/234, 348; 414/111, 525.54, 549, 699, 789.7, 786

[56] References Cited

U.S. PATENT DOCUMENTS

| | | | |
|---|---|---|---|
| 4,044,838 | 8/1977 | Wooldridge | 172/2 |
| 4,934,463 | 6/1990 | Ishida et al. | 172/4.5 |
| 5,088,020 | 2/1992 | Nishida et al. | 364/160 |
| 5,293,944 | 3/1994 | Matsumoto | 172/2 |
| 5,386,877 | 2/1995 | Codina et al. | 172/699 |
| 5,462,125 | 10/1995 | Stratton et al. | 172/826 |
| 5,467,829 | 11/1995 | Barton et al. | 172/4.5 |

*Primary Examiner*—Terry Lee Melius
*Assistant Examiner*—Robert Pezzuto
*Attorney, Agent, or Firm*—David M. Masterson

[57] ABSTRACT

An apparatus controls the movement of a ripper for a machine. Tilt and lift cylinders controllably actuate the ripper. Hydraulic control valves control the flow of hydraulic fluid to the respective cylinder. An auto-return button produces an auto-return signal in response to being depressed by the machine operator. A controller receives the auto-return signal and delivers a ripper control signal to the hydraulic control valves to automatically raise the ripper to a predetermined position.

5 Claims, 2 Drawing Sheets

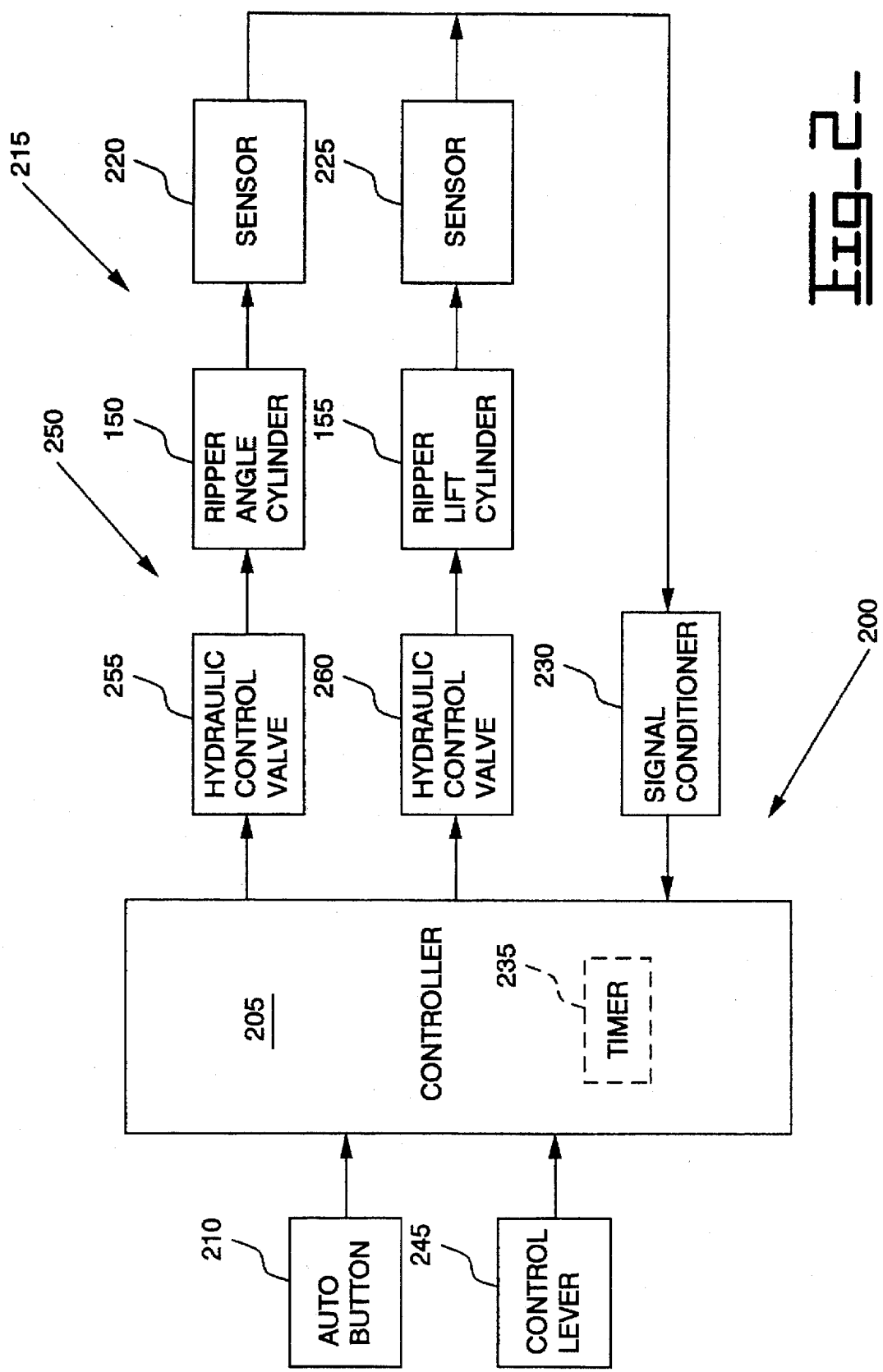

5,685,377

AUTO-RETURN FUNCTION FOR A BULLDOZER RIPPER

TECHNICAL FIELD

This invention relates to a control system for a bulldozer ripper and more particularly to a control system for automatically returning a bulldozer ripper to an upper position from a lower position.

BACKGROUND ART

Systems for controlling the position of a ripper associated with and earth moving machine such as a bulldozer have been utilized for decades. Typically, the control system enables a machine operator to control the angle of the ripper by way of a fluid operated system. Because such systems are manually controlled, operating the ripper takes an amount of operator time which negatively effects his productivity.

The present invention is directed to overcoming one or more of the problems as set forth above.

DISCLOSURE OF THE INVENTION

In one aspect of the present invention, an apparatus for controlling the movement of a ripper for a machine is disclosed. Tilt and lift cylinders controllably actuate the ripper. Hydraulic control valves control the flow of hydraulic fluid to the respective cylinders. An auto-return button produces an auto-return signal in response to being depressed by the machine operator. A controller receives the auto-return signal and delivers a ripper control signal to the hydraulic control valves to automatically raise the ripper to a predetermined position.

BRIEF DESCRIPTION OF THE DRAWINGS

For a better understanding of the present invention, reference may be made to the accompanying drawings in which:

FIG. 2 is a diagrammatic schematic representation of an embodiment of the control system of the present invention.

BEST MODE FOR CARRYING OUT THE INVENTION

Figure 1:
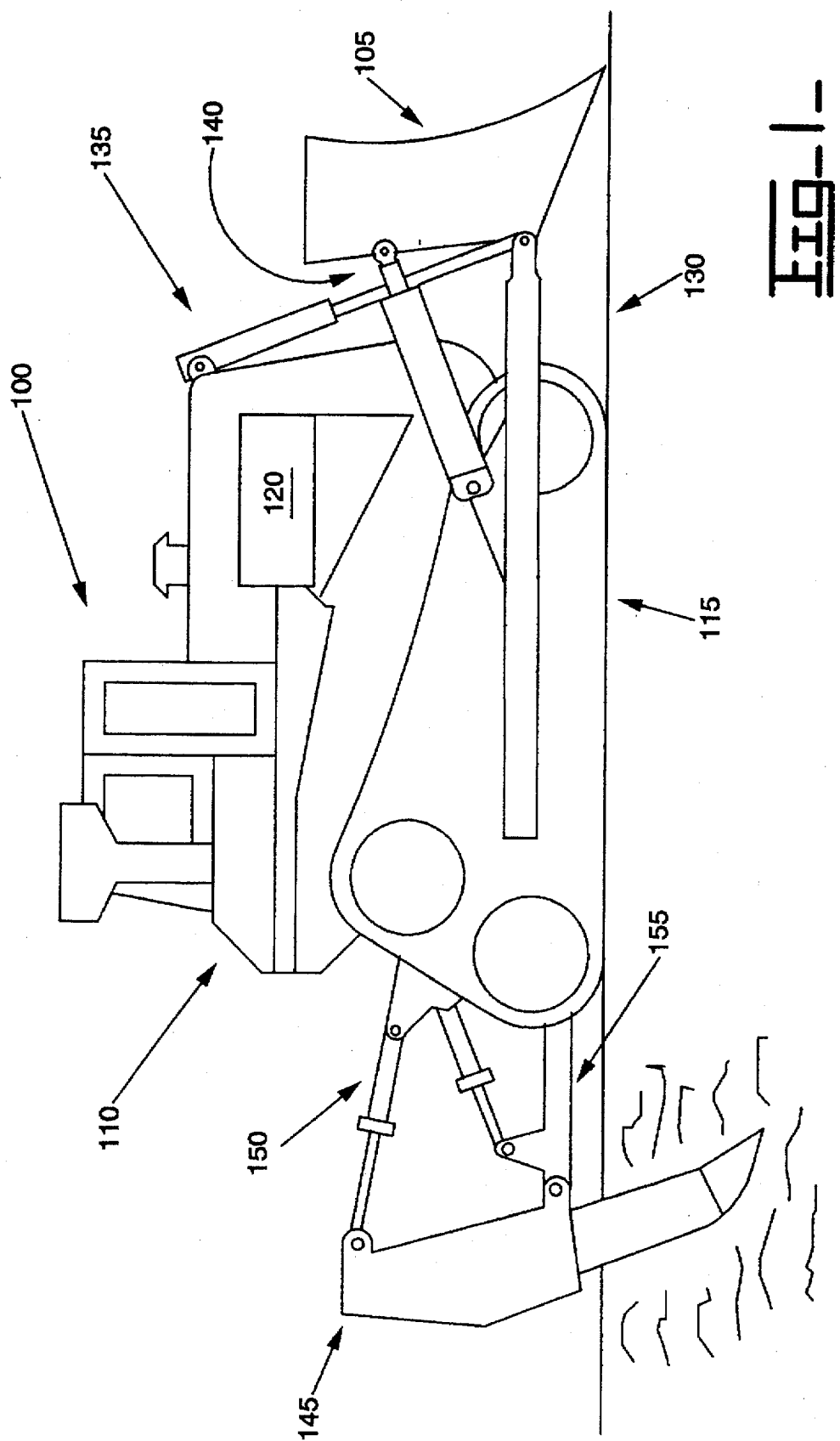
FIG. 1 is a diagrammatic side elevational view of an earth working machine having a ripper.

The following detailed description of the invention will describe one application of the preferred embodiment of the preferred use on an earth working machine, such as a bulldozer. Shown in FIG. 1 is a side elevational view of a bulldozer 100 having an elongated blade 105 and a ripper 145.

The machine 100 has a frame 110, an undercarriage 115 connected to the frame 110, and a prime mover 120 such as an internal combustion engine. The prime mover 125 is drivingly connected to an endless track 130 of the undercarriage 115, in any conventional well known manner. The prime mover rotates the track 130 and propels the machine 100 over the underlying terrain.

The blade 105 is controlled through the movement and positioning of blade lift cylinders 135 and blade tilt cylinders 140. Although not shown, the machine preferably includes two blade lift cylinders 135 and two blade tilt cylinders 140, one on each side of the blade 105. The ripper 145 is controlled through movement and positioning of a ripper tilt cylinder 150 and a ripper lift cylinder 155.

Referring to FIG. 2, a block diagram of the ripper control system 200 associated with the present invention is shown.

The control system 200 provides for both automatic and manual control of the ripper 145. Preferably, the ripper control system includes a microprocessor based controller 205. The controller 205 is adapted to sense a plurality of inputs and responsively produce output signals which are delivered to various hydraulic actuators or cylinders of the control system.

A joystick 245 is pivotally movable to a plurality of different positions and provides for manual control of the ripper.

An auto-return button 210 is provided for the operator to select an automatic ripper return function. Under the automatic ripper return function, the control system automatically raises the ripper to an upright or fully raised position.

Position sensing means 215 produces position signals in response to the position of the ripper 145. In one embodiment, the position sensing means 215 includes a pressure sensor 225 that senses the hydraulic pressure within a respective ripper cylinder 150,155 and produces a position signal in response to sensing a hydraulic pressure spike. The hydraulic pressure spike is indicative of the ripper being at the fully raised position. Note that, a pressure switch is a suitable replacement for the pressure sensor. In another embodiment, the position sensing means 225 includes a timer 235 that counts down (or up) from a first predetermined time value to a second predetermined time value and responsively produces a position signal. For example, the timer 235 initiates a count down sequence in response to the operator depressing the auto-return button 210. Once the timer 235 reaches a second predetermined time value, such as zero, then the ripper is said to at the fully raised position. In yet another embodiment, the position sensing means 215 may include displacement sensors 220,225 that sense the amount of cylinder extension in the ripper tilt and lift cylinders 150, 155 and responsively produce position signals indicative of the amount of cylinder extension in the respective cylinders. For example, the displacement sensors 220,225 may include a linear variable differential transformer (LVDT). It should be noted that other well known devices, for example, a magnetostrictive sensor, yo-yo type encoder, potentiometer, or resolver, and an RF signal generator are suitable replacements for the LVDT and within the scope of the invention.

The position signals are delivered to the controller 205 via a signal conditioner circuit 230 which converts the position signals into digital signals for the purpose of further processing. Such signal conditioner circuits are well known in the art. Note that, the signal conditioner circuit 230 may be part of the controller 205 and implemented in software.

When the auto-return button 210 is depressed, an auto-return signal is delivered to the controller 205 which directs a ripper control signal to a fluid operated ripper control system 250. The fluid operated control system 250 includes hydraulic control valves 255,260 which control the flow of hydraulic fluid to the respective hydraulic cylinders 150,155. The ripper control signal commands a driver circuit of any suitable commercially available type to effect actuation of the hydraulic control valves 255,260 to raise the ripper to the upright position. The controller 205 receives the cylinder position signals and determines when each cylinder moves to a predetermined position that is representative of the ripper being at the upright position. Once a cylinder is determined to be at the predetermined position, then the controller 205 stops delivering the ripper control signal to the associated hydraulic control valve. Thus, the controller 205 may actuate one or both of the hydraulic cylinders 150,155 in order to move the ripper to the upright position, Thus, while the present invention has been particularly shown and described with reference to the preferred embodiment above, it will be understood by those skilled in the art that various additional embodiments may be contemplated without departing from the spirit and scope of the present invention.

Industrial Applicability

As shown, the present invention provides the operator with an automatic function that raises the ripper to the upright position in order to free valuable time for the operator to perform other functions; thereby, increasing his work productivity.

Other aspects, objects and advantages of the present invention can be obtained from a study of the drawings, the disclosure and the appended claims.

We claim:

1. An apparatus for automatically controlling the movement of a ripper for a machine, comprising:

ripper tilt and lift cylinders being connected to the ripper;

hydraulic control valves being adapted to deliver pressurized hydraulic fluid to the respective ripper tilt and lift cylinders;

an auto-return button being adapted to produce an auto-return signal in response to being depressed by a machine operator; to and a controller being adapted to receive the auto-return signal and deliver a ripper control signal to the hydraulic control valves to cause pressurized fluid flow to actuate the cylinders and automatically raise the ripper to a predetermined position.

2. An apparatus, as set forth in claim 1, including a position sensing means for producing a plurality of position signals responsive to the position of the ripper, the controller receiving the position signals, determining when the ripper is at the predetermined position, and stopping the delivery of the ripper control signal.

3. An apparatus, as set forth in claim 2, wherein the position sensing means includes pressure sensors that sense the hydraulic pressure within each of the ripper lift and tilt cylinders and produce respective position signals in response to sensing a hydraulic pressure spike within the respective cylinder, the hydraulic pressure spike being indicative of the ripper being at the predetermined position.

4. An apparatus, as set forth in claim 2, wherein the position sensing means includes a timer for each of the ripper lift and tilt cylinders that counts down upon depression of the auto-return button from a determined time to zero and responsively produces a respective position signal corresponding to each cylinder, the production of the position signals being indicative of the ripper being at the predetermined position.

5. A method for automatically controlling the movement of a ripper for a machine having tilt and lift hydraulic cylinders connected to the ripper and hydraulic control valves being adapted to deliver hydraulic fluid to the respective cylinders, comprising the steps of:

producing an auto-return signal;

receiving the auto-return signal and delivering a ripper control signal to the hydraulic control valves to cause pressurized fluid flow to actuate at least one of the cylinders and raise the ripper;

determining the position of at least one of the hydraulic cylinders and producing a respective position signal responsive to the position thereof; and receiving the position signal, determining when the one hydraulic cylinder is at a predetermined position, and stopping the delivery of the ripper control signal to the associated hydraulic control valve in response to the cylinder being at the predetermined position.

* * * * *

UNITED STATES PATENT AND TRADEMARK OFFICE
CERTIFICATE OF CORRECTION

PATENT NO. : 5,685,377
DATED : November 11, 1997
INVENTOR(S) : Richard A. Arstein, Richard J. Skiba It is certified that error appears in the above-identified patent and that said Letters Patent is hereby corrected as shown below:

Claim 1, column 3, line 25, please delete "to"

Signed and Sealed this

Fourteenth Day of April, 1998

Attest:

BRUCE LEHMAN

*Attesting Officer*  *Commissioner of Patents and Trademarks*